April 1, 1969     H. R. HUTCHINSON     3,436,443

MOLDING APPARATUS AND METHOD

Filed May 11, 1965

INVENTOR.
HERMAN R. HUTCHINSON
BY Seidel & Gonda
ATTORNEYS.

INVENTOR.
HERMAN R. HUTCHINSON
BY Seidel & Gonda
ATTORNEYS.

United States Patent Office 3,436,443
Patented Apr. 1, 1969

3,436,443
MOLDING APPARATUS AND METHOD
Herman R. Hutchinson, Wyncote, Pa., assignor to Pennsalt Chemicals Corporation, Philadelphia, Pa., a corporation of Pennsylvania
Filed May 11, 1965, Ser. No. 454,886
Int. Cl. B29c 17/04
U.S. Cl. 264—40                                    15 Claims The present invention relates to molding apparatus such as an injection molding machine, a blow molding machine, a transfer molding machine, and the like. More particularly, the present invention is directed to such machines having a movable transfer ram or screw for delivering plasticized molding material to mating dies and the method of operating the same.

In a blow molding, injection molding or transfer molding machine using an in-line reciprocating screw type preplasticizer, normally the screw rotates for some portion of the total cycle time. As total cycle times are being reduced by improvements in cooling or curing rates in the molding processes, less and less time is made available for pre-plasticizing a charge of material. Ultimately, a point is reached demanding that the screw rotate continuously and if a screw is made to continuously rotate, a problem arises in that the plasticizing rate of the screw must match precisely the consumption rate of the machine, otherwise an excess or shortage of plasticized material available for molding will gradually occur and thus necessitate stopping the operation for correction.

It follows then that in order to permit continuous rotation, a compensating means would be necessary to take care of minor variations in either plasticizing or consumption rate from cycle to cycle.

The present invention includes the provision of an apparatus and a method for automatically compensating for an undershoot or overshoot with respect to a norm. In the preferred embodiments of the present invention, as will be made clear hereinafter, the compensation is effected by varying the speed of the return stroke of the screw in response to its forward position on its previous stroke. Such compensation includes means for providing a high and a low speed for the screw during portions of its return stroke.

It is an object of the present invention to provide a novel molding machine which automatically compensates for an overshoot or undershoot.

It is another object of the present invention to provide a novel method for automatically compensating for an overshoot or an undershoot in a molding machine.

It is another object of the present invention to provide a novel molding machine and method wherein a movable transfer screw is provided with a return stroke having at least two different speeds.

It is still another object of the present invention to provide a novel molding machine and method wherein an overshoot is automatically compensated for by increasing the period of time for high-speed rotation and decreasing the period of time for low-speed rotation during the return stroke of the movable screw.

It is another object of the present invention to provide a novel molding machine and method wherein an undershoot is automatically compensated for by decreasing the time for high-speed and increasing the time for low-speed movement of the screw during its return stroke.

It is yet another object of the present invention to provide a novel molding machine which compensates for differences between the plasticizing rate of a continuously rotating screw preplasticizer and the plasticized material consumption rate of the molding machine.

Other objects will appear hereinafter.

For the purpose of illustrating the invention, there are shown in the drawings forms which are presently preferred; it being understood, however, that this invention it not limited to the precise arrangements and instrumentalities shown.

FIGURE 2 is a time distance graph for the return stroke of the ram or screw of the embodiment in FIGURE 1.

FIGURE 3 is a schematic wiring diagram for the embodiment in FIGURE 1.

Referring to the drawing in detail, wherein like numerals indicate like elements, there is shown in FIGURE 1 a longitudinal sectional view of a blow molding machine designated generally as 10.

Figure 1:
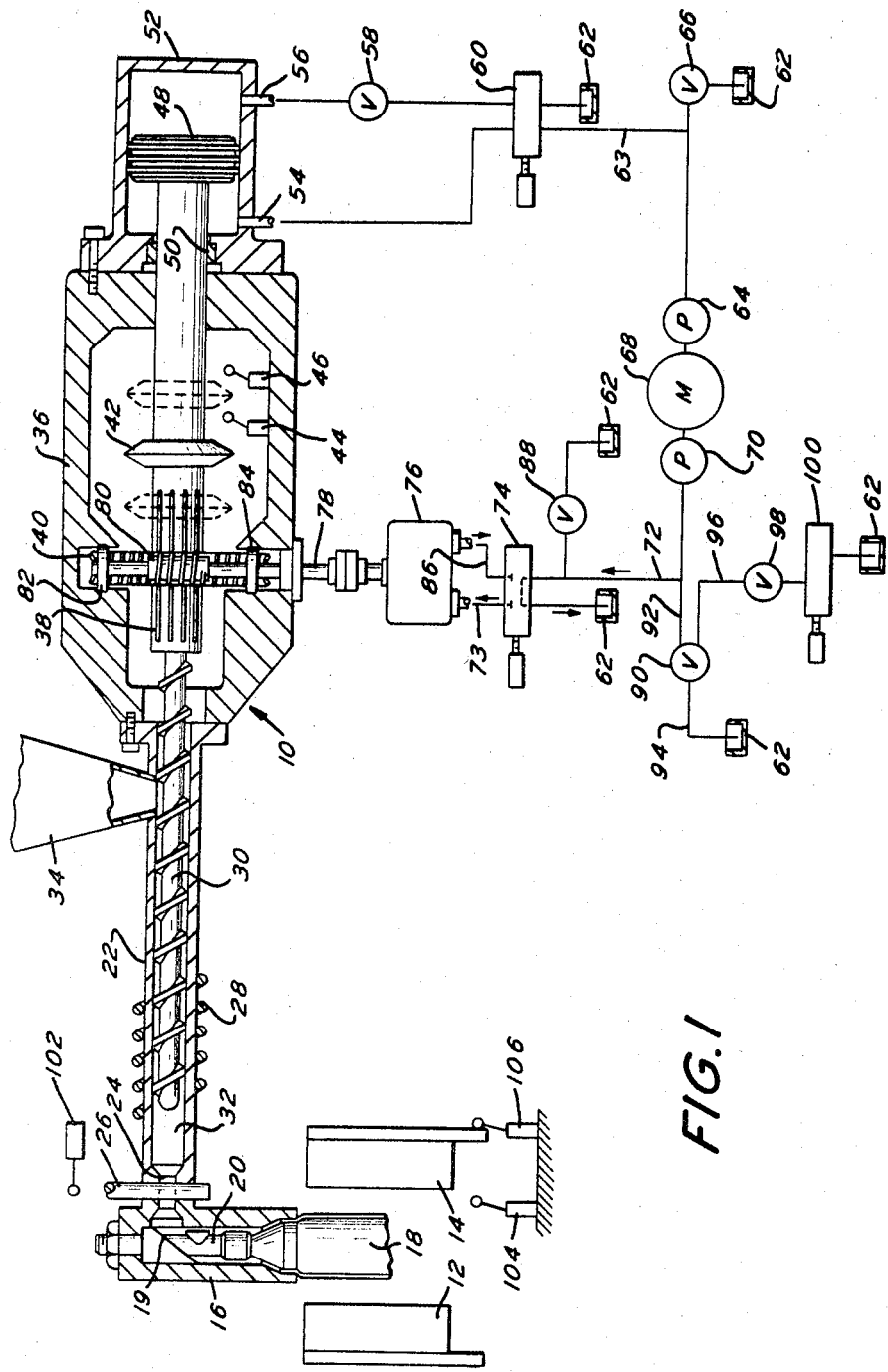
FIGURE 1 is a longitudinal sectional view of one embodiment of the present invention incorporated in a blow molding machine.

Referring to the left-hand end of FIGURE 1, it will be seen that the blow molding machine 10 includes a first die 12 and a mating die which may be referred to as a second die 14. Conventional apparatus not shown will be provided to support the dies 12 and 14 for relative movement with respect to each other in timed relationship with the operation of the remainder of the machine 10. A nozzle head 16 is provided above the dies 12 and 14, and a parison 18 will be directed from head 16 into the space between the dies 12 and 14 when they are in their open position.

The nozzle head 18 includes a conventional nozzle 20. The outer surface of the nozzle 20 and the inner surface of the nozzle head 16 cooperate to define a flow path which is annular in cross section for extrusion of a hollow parison 18. A conduit means (not shown) is coupled to the nozzle 20 so that a gas may be discharged through the nozzle 20 in a conventional manner. A baffle plate 19 is provided within the nozzle head 16 opposite the radially outwardly directed passageway 24.

The flow of molding material through the passageway 24 is selectively controlled by a reciprocal valve member 26. The passageway 24 is in communication with the interior of a transfer barrel or cylinder 22 to the right of the valve member 26. A heater coil or the equivalent is provided around the cylinder 22. A transfer member is reciprocally supported within the cylinder 22. The transfer member is preferably a screw 30 as illustrated.

An accumulation zone designated generally as 32 is provided for at the forward end of the cylinder 22 adjacent the passageway 24. Molding material in granular form is introduced into the cylinder 22 by way of hopper 34. Hopper 34 communicates with cylinder 22 adjacent the rear end thereof. The rear end of the cylinder 22 is the end remote from the passageway 24.

The cylinder 22 is removably coupled to one end of a housing 36. The housing 36 is hollow and has an opening in its front end which is adapted to be in open communication with the interior of the cylinder 22 so that the screw 30 may be partially disposed within cylinder 22 and housing 36. Within housing 36, the screw 30 is provided with an enlarged diameter portion having longitudinally extending splines 38 on its outer periphery. The splines 38 mate with axially directed grooves on the inner surface of a driven member. The driven member 40 is preferably a worm gear. Hence, gear 40 may rotate the screw 30 while at the same time enabling the screw 30 to have movement in its longitudinal direction with respect to the gear 40. Other well-known devices may be substituted for the splines or for gear 40.

The housing 36 is provided with a pair of switches 44 and 46 which are spaced apart. The switch 44 is adapted to be actuated by a trip member 42 on the screw 30. Switch 46 is a safety switch which will automatically shut off the machine 10 if contacted by the trip member 42. The purpose of switch 46 will be made clear hereinafter. Further, means may be provided to adjust the longitudinal position of switches 44 and 46.

A hollow housing 52 is axially coupled to the housing 36. An aperture in the front wall of housing 52 is aligned with an aperture in the rear wall of housing 36, and the large diameter portion of the screw 30 extends therethrough. The enlarged diameter portion of the screw 30 terminates in a piston 48 within housing 52. A seal 50 is provided in the front wall of the housing 52 for engagement with the outer periphery of the enlarged diameter portion of the screw 30.

The application of pressure to opposite faces of the piston 48 is intended to cause reciprocation of the screw 30 as will be made clear hereinafter. In its forwardmost position, the trip member 42 assumes the phantom position adjacent the gear 40. In its rearmost normal position, the trip member 42 assumes the phantom position between the switches 44 and 46. The switch 46 performs its safety function by stopping machine 10 when contacted by the trip member 42 to thereby prevent the piston 48 from bottoming out against the back wall of the housing 52.

Conduits 54 and 56 communicate with the interior of housing 52 on opposite sides of the piston 48. Conduit 56 is provided with an adjustable back pressure valve 58. A solenoid operated valve 60 selectively controls flow in conduits 54 and 56. An outlet conduit from valve 60 is directed to a return channel 62. An inlet conduit 63 extends between valve 60 and pump 64. A bypass valve 66 is connected to conduit 63 and has an outlet adapted to be in communication with said return channel 62.

Pump 64 is driven by one side of a double-ended motor 68. The other side of motor 68 drives a pump 70. Pumps 64 and 70 have their inlets connected to a source of motive fluid (not shown). The outlet of pump 70 is connected by way of conduits 72 and 73, through solenoid operated valve 74, to the inlet side of a hydraulic motor 76. The hydraulic motor 76 has an output shaft 78. A worm 80 is provided on the shaft 78 in meshing engagement with the gear 40. Shaft 78 is supported intermediate its ends by bearings 82 and 84 on the housing 36.

An outlet conduit 86 extends between the hydraulic motor 76 and valve 74. In the normal inoperative position of the valve 74, conduit 72 communicates through valve 74 with the return channel 62. In an operative position of valve 74, conduit 72 communicates with the hydraulic motor 76 by way of conduit 73 to drive motor 76 and conduit 86 communicates with the return channel 62.

Conduit 92 extends between conduit 72 and a system relief valve 90. One outlet of valve 90 communicates by way of conduit 94 to the return channel 62. The other outlet of valve 90 communicates by way of conduit 96 to a low speed control relief valve 98. The outlet of valve 98 communicates with the return channel 62 by way of a solenoid operated low speed valve 100.

A valve open limit switch 102 is provided for valve 26. A closed limit switch 104 and an open limit switch 106 are provided for the die 14.

Figures 2, 3:
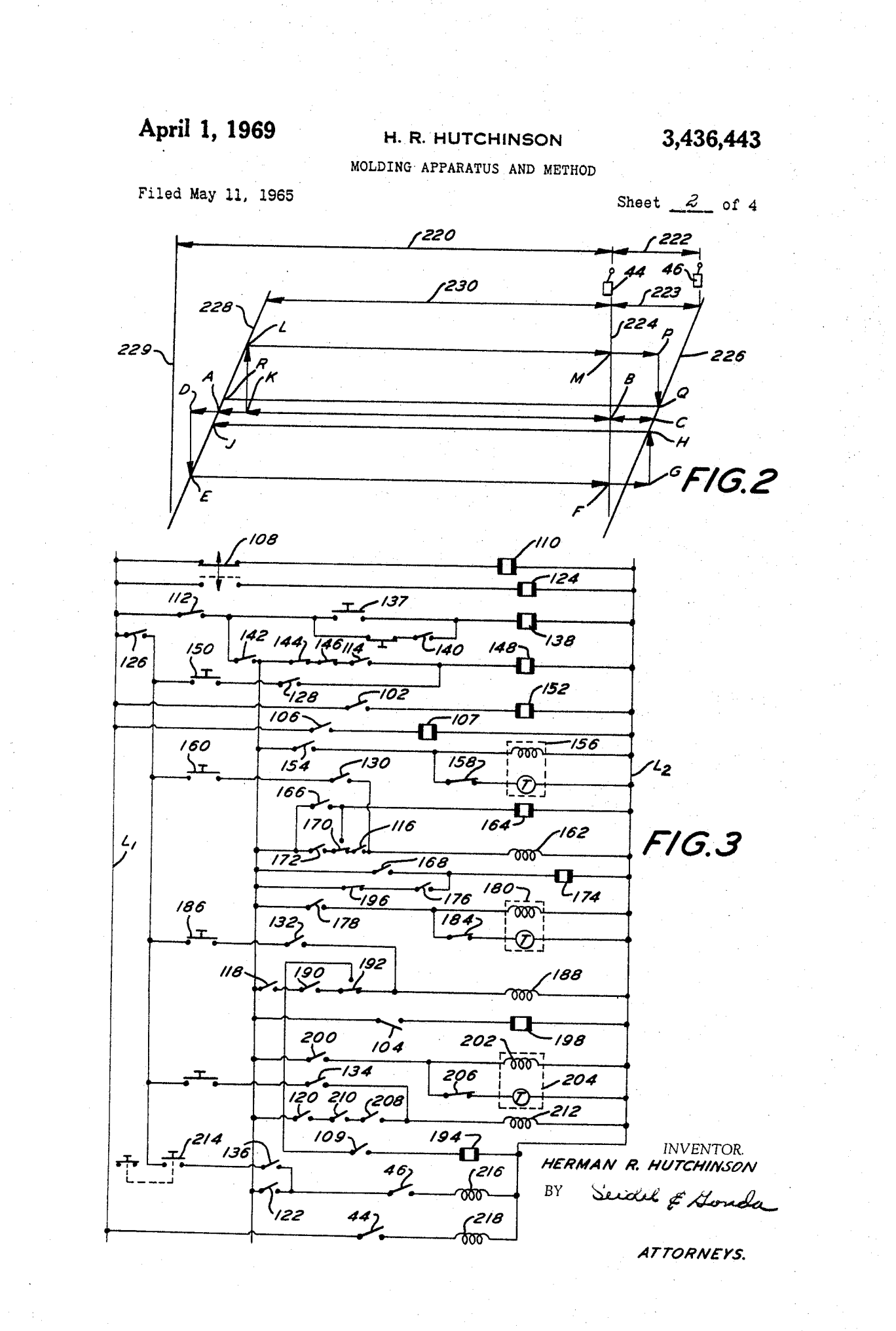

Referring to the wiring diagram in FIGURE 3, it will be noted that the circuitry includes electrical conductor lines $L_1$ and $L_2$ adapted to be connected to a source of current. A double pole switch 108 for manual operation in the phantom position or automatic operation in the solid line position is coupled across lines $L_1$ and $L_2$ through a relay 110. Relay 110 controls normally open switches 112, 114, 116, 118, 120 and 122.

When the switch 108 is in the phantom position, it is coupled across lines $L_1$ and $L_2$ through a relay 124. Relay 124 controls normally open switches 126, 128, 130, 132, 134 and 136. A normally open cycle-start pushbutton switch 137 is coupled acros line $L_1$ and $L_2$ in series with switch 112 and a relay 138. Relay 138 controls normally open switch 140 in parallel with switch 137 as well as switch 142. Switch 142 is coupled across the lines $L_1$ and $L_2$ in series with switch 112, switch 114, normally closed switches 144 and 146, and solenoid 148 for controlling the opening movement of valve member 26.

When the switch 108 is in the phantom position, and it is desired to activate solenoid 148, manual pushbutton switch 150 is provided in series with solenoid 148, switch 126 and switch 128.

The valve open limit switch 102 is coupled across the lines $L_1$ and $L_2$ in series with a relay 152. Relay 152 controls normally open switch 154 which is coupled across the lines $L_1$ and $L_2$ in series with switches 112, 142 and a screw advance timer 156. Timer 156 has a motor and controls switch 158 and instantaneous contact of the timer 156. Timer 156 also controls switch 170 which is adapted to place either relay 164 or switch 116 in series with switch 172. For manual operation, screw advance pushbutton switch 160 is provided in series with switches 126, 130 and coil 162 for the solenoid operated valve 60. Relay 164 is coupled across the lines $L_1$ and $L_2$. Relay 164 controls the normally open switches 166 and 168 and normally closed switch 144.

Switch 168 is in series with a relay 174. Relay 174 controls normally open switches 176 and 178 and normally closed switch 146. Switch 178 is coupled across the lines $L_1$ and $L_2$ in series with a second timer 180 which controls movement of the die 14 between its open and closed positions as effected by a motor (not shown). Switches 184 and 192 together with instantaneous timer contact 190 are controlled by timer 180. For manual operation, a switch 186 is provided in series with switch 132 and coil 188 for controlling operation of the clamp 12, 14. During automatic operation, coil 188 is in series with normally open switch 118, normally open contact 190, and switch 192.

When moved from the position illustrated, switch 192 coupled current to a relay 194 to control normally closed switch 196, which is in series with switch 176. The closed limit switch 104 for the die 14 is in series wth relay 198. Relay 198 controls normally open switch 200 coupled across the lines $L_1$ and $L_2$ in series with a coil 202 of a third timer 204. Timer 204 functions as an interlock for preventing the release of blow-air before the clamp 12, 14 is fully closed.

Timer 204 controls normally closed switches 206 and 208. A switch 210 is in series with switches 120 and 208 and a coil 212. Coil 12 controls a solenoid valve (not shown) for discharge of air through nozzle 20. A stop-start manual switch 214 is provided in series with switch 136 and coil 216. Coil 216 controls the solenoid operated valve 74. The extrusion slowdown limit switch 44 is in series with coil 218. Coil 218 controls the solenoid operated valve 100.

Referring to FIGURE 2, there is illustrated therein the schematic time-distance diagram for the movement of the screw 30. The line 220 designates the high speed return zone and the line 222 designates the low speed return zone and extends to a point where the trip member 42 would contact the safety limit switch 46. Let it be assumed that it is desired to have line 222 represent twelve seconds. That is, at a predetermined rotational speed lasting twelve seconds screw 30 will return a distance directly proportional to the length of line 222. By projecting a line downwardly from each end of line 222 to a line 223 adjacent switches 44, 46, and then drawing a slanted line 226 to intersect a vertical line 224 drawn from switch 44, there are provided lines 224 and 226 which have an included angle of approximately thirty degrees. As will be apparent, this angle is not critical. A line 228 is drawn parallel to line 226 until it intersects a line 229 projected downwardly from the lefthand extremity in line 220.

Line 229 represents the point of farthest advance of screw 30 using trip member 42 as the point of measurement. Lines 228 and 224 define a line 230 having a representative value of approximately eight seconds. Any horizontal line drawn between parallel lines 226 and 228 is constant in length with only its ends varying in position. These horizontal lines represent the advance or forward stroke of screw 30 which is substantially constant in length but tends to have varying starting and stopping points for reasons explained more fully below.

Assuming that it would be desirable to have a return stroke of fifteen seconds for the screw 30, this would normally be divided into a high speed return stroke defined by the points A and B and a slow speed for the balance of the return stroke as defined by the points B and C. The line AB could be nine seconds and the line BC could be six seconds.

During operation of the machine 10, the screw 30 tends to deviate from the norm defined by points A, B and C. One such deviation would be an overshoot whereby the front end of the screw will terminate at point D instead of point A. This can occur if less than a predetermined amount of molding material was present in the accumulation zone 32 from the previous plasticizing cycle or if more than the normal amount of material is stroked out of zine 32 while forming the parison or shot. By projecting point D downwardly until it intersects line 228 at point E, it will be seen that the high speed return stroke of the screw 30 will be defined by the line EF having a value of 9.6 seconds. Such return stroke will be at high speed until trip member 42 trips switch 44. Thereafter, screw 30 will be rotated at a low speed until the timer 156 times out. Since the timer 156 is set for fifteen seconds, the screw 30 will return at low speed between the points FG for a period of 5.4 seconds.

Since the line EF is longer than the line AB, the screw 30 will be rotating at high speed for a longer period of time and therefore will increase the amount of molding material which will be plasticized and introduced into the accumulation zone 32 to compensate for the overshoot on the previous stroke. On the next forward stroke of the screw as determined by the line HJ, that portion of the stroke HJ which is between switch 44 and point J, although less in length than EF, is still longer than AB but a decreased amount of molding material has been plasticized during this cycle than the previous compensating cycle. The next cycle will result in even a lesser amount being plasticized. Thus cycle by cycle a decreasing rate of compensation takes place until the machine is operating on line CA again.

An undershoot occurs when more than a predetermined amount of molding material is present in the accumulation zone 32 or less than the normal amount of material is stroked out of zone 32 while forming the parison or shot. Under these conditions at the end of the forward movement of the screw 30, an undershoot has occurred with the forward end of the screw 30 terminating at point K. To compensate for the undershoot, the high speed return stroke of the screw 30 will be defined by the line LM which is for a shorter period of time than the norm, namley 8.4 seconds. Since the overall time period for the return stroke is set at fifteen seconds by the timer 156, the tripping of switch 44 by trip member 42 will result in a low speed rotation of the screw 30 for a period of 6.6 seconds as defined by line MP. In the manner described above for an overshoot, each succeeding cycle will bring the stroke closer to the normal, until finally the return stroke CA is achieved and screw extrusion time is nine seconds in high speed zone and six seconds in low speed zone. Regardless of whether there is an undershoot or an overshoot, compensation is obtained by varying the period of time of the high and low speed portions of a return stroke in response to the forward position of the front end of the screw 30 on the previous stroke.

Operation of the machine 10 is as follows:

The sequence of operations for an automatic cycle as set forth hereinafter assumes that the screw 30 is at its rearmost position determined by point C, the screw 30 is stopped, valve 26 is closed, and the dies 12 and 14 are in the position illustrated in FIGURE 1. With switch 108 in the position illustrated in FIGURE 3, pushbutton switch 137 is manually closed thereby closing switches controlled by relays 110 and 138. Coil 148 will then be activated to move valve member 26 to an open position until it activates open limit switch 102. When switch 102 is closed thereby, relay 152 is activated to close switch 154. Screw advance timer 156 starts timing and closes switches 172 and 170. Hence, coil 162 is activated to operate valve 60. The introduction of motive fluid from pump 64 into housing 52 by way of conduit 56 causes the screw 30 to advance while rotating at high speed.

As the screw 30 advances, it causes plasticized molding material to be introduced into the nozzle head 16 from which it exits as a hollow parison 18. When the screw advance timer 156 times out, valve member 26 moves to a closed position. At the same time, the dies 12 and 14 move to a closed position and then air is discharged from the nozzle 20 into the hollow parison. The screw 30 continues to rotate at high speed plasticizing the molding material which is continuously fed into the accumulation zone 32. As material accumulates in zone 32, the screw 30 is moved from left to right in FIGURE 1. The return stroke time period for screw 30 is a constant but the return stroke length will vary in accordance with the principles discussed above to compensate for any change in the final forward position thereof on the previous advancing stroke. As soon as the trip member 42 trips switch 44, the remainder of the return stroke will be at a slower speed. Compensation will be made for either an undershoot or overshoot since the screw will continue to rotate and cause preplasticized molding material to enter the accumulation zone 32. The total plasticizing time is a constant and compensation takes place as follows:

Compensating for overshoot (shortage of material in chamber 32): Screw 30 plasticizes for a longer period of time at high speed and a correspondingly shorter period of time at low speed in order to increase the volume of shot prepared.

Compensating for undershoot (excess of material in chamber 32): Screw 30 plasticizes for a shorter period of time at high speed and a correspondingly longer period of time at low speed in order to decrease the volume of shot prepared.

Compensation repeats until normal conditions are again achieved.

When trip member 42 trips switch 44, coil 218 of the solenoid operator for valve 100 will cause the valve to switch to a position wherein relief valve 98 enables some of the motive fluid from pump 70 to be diverted through conduit 96 to the return channel 62. In doing so, a lesser amount of fluid is introduced into the hydraulic motor 76 thereby effecting the lowering of the rotational speed of screw 30. Since the speed of rotation is changed, the amount of material which will be plasticized and introduced into the accumulation zone 32 will change proportionally and thereby change the length of the return stroke. During the advancing movement of the screw 30 by the introduction of motive fluid through conduit 56 into housing 52, conduit 54 is placed by valve 60 into communication with the return channel 62. Whenever the pressure of the motive fluid in conduit 63 exceeds a predetermined value, valve 66 will open and permit a portion of the fluid to be returned to the return channel 62. While a plurality of return channels 62 are illustrated in FIGURE 1, it will be appreciated that all of the return channels are a single container which will communicate with a source of supply for motive fluid. Valve 90 performs the same function as valve 66.

As each relay closes its respective normally open switches, timers 180 and 204 will begin timing. Thereafter, the previously activated timer 180 for the dies 12 and 14, as well as the timer 204 for the control of air will time out in proper sequence. This results in the dies 12 and 14 being moved to the position illustrated in FIGURE 1 at which point limit switch 106 will be tripped to cause the cycle to repeat itself by energizing relay 107 to close switch 109. This energizes relay 194.

In view of the above remarks, it is believed that a more detailed explanation of the circuitry in FIGURE 3 in the operation of the machine 10 is not necessary. With respect to the rotational speeds, the low speed may be pre-set from as low as 50% up to as high as 95% of the rotational speed in the high speed zone. The length of stroke for low speed operation is also adjustable by shifting the location of slow down switch 44.

The maximum capacity of the machine is achieved by the combination of adjusting the low speed to be as close to the high speed as possible and at the same time keeping the length of low speed stroke as short as possible. If under these setting, variations in the machine cycle happen to exceed the compensating ability, then either the low speed can be further reduced, then length of low speed stroke increased or a combination of both can increase the compensating ability.

Figure 4:
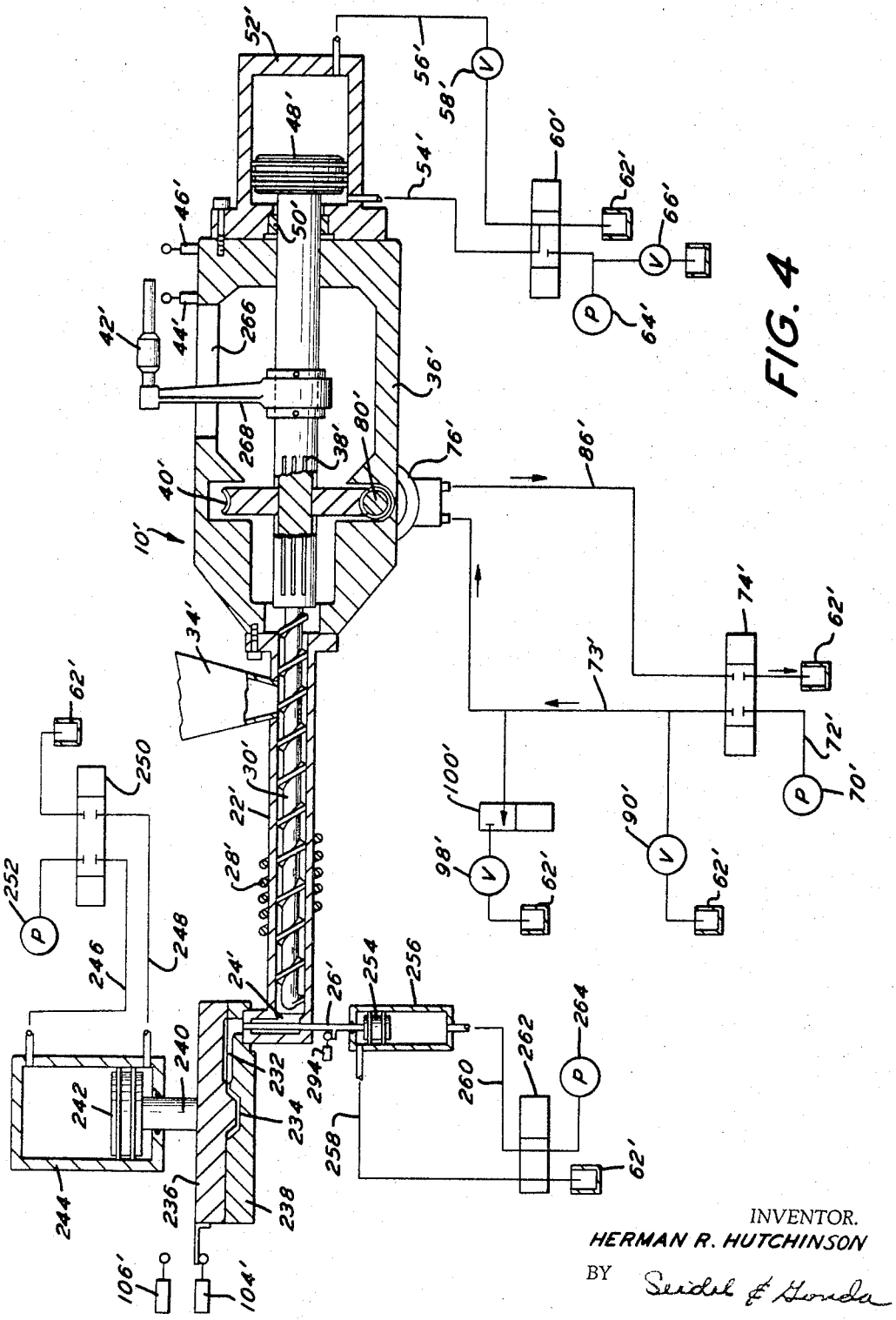
FIGURE 4 is a longitudinal sectional view of another embodiment of the present invention illustrating an injection molding machine.

In FIGURE 4, there is illustrated another embodiment of the present invention incorporated in an injection molding machine designated generally as 10'. Accordingly, corresponding elements of machine 10' are provided with corresponding primed numerals. The machine 10' is similar to that illustrated in U.S. Patent 3,133,316, the disclosure of which is incorporated herein by reference.

The passageway 24' communicates by way of a sprue cavity 232 with a mold cavity 234 between the mating mold halves 236 and 238. The mold half 236 is mounted for reciprocal movement towards and away from the mold half 238. The reciprocatory movement of the mold half 236 is effected by means of a piston rod 240. Rod 240 has one end secured to the mold half 236 and terminates in a piston 242 at its other end. The piston 242 is disposed within a cylinder 244.

Conduits 246 and 248 communicate with opposite ends of the cylinder 244. The conduits 246 and 248 are connected to a valve 250. Valve 250 is a sliding spool supply and exhaust valve which is commercially available and adapted to be solenoid operated. The conduits 246 and 248 are adapted to be selectively and alternatively placed in communication with a pump 252 or a return channel 62' in response to actuation of the valve 250.

The valve member 26' controlling flow through the passageway 24' is connected to a piston 254 disposed within a cylinder 256. Motive fluid is introduced into the cylinder 256 at opposite sides of the piston 254 by way of conduits 258 and 260. These conduits selectively and alternatively communicate through a valve 262 with a pump 264 and a return chanel 62'. Valve 262 is preferably of the same type as valve 250.

The housing 36' is provided with a slot 266. An adaptor 268 is attached to the enlarged diameter portion of the screw 30' and supports at its free end the trip member 42'. The switches 44' and 46' are supported externally of the housing 36'. A valve member closed position limit switch 294 is provided for cooperation with valve member 26'.

Figure 5:
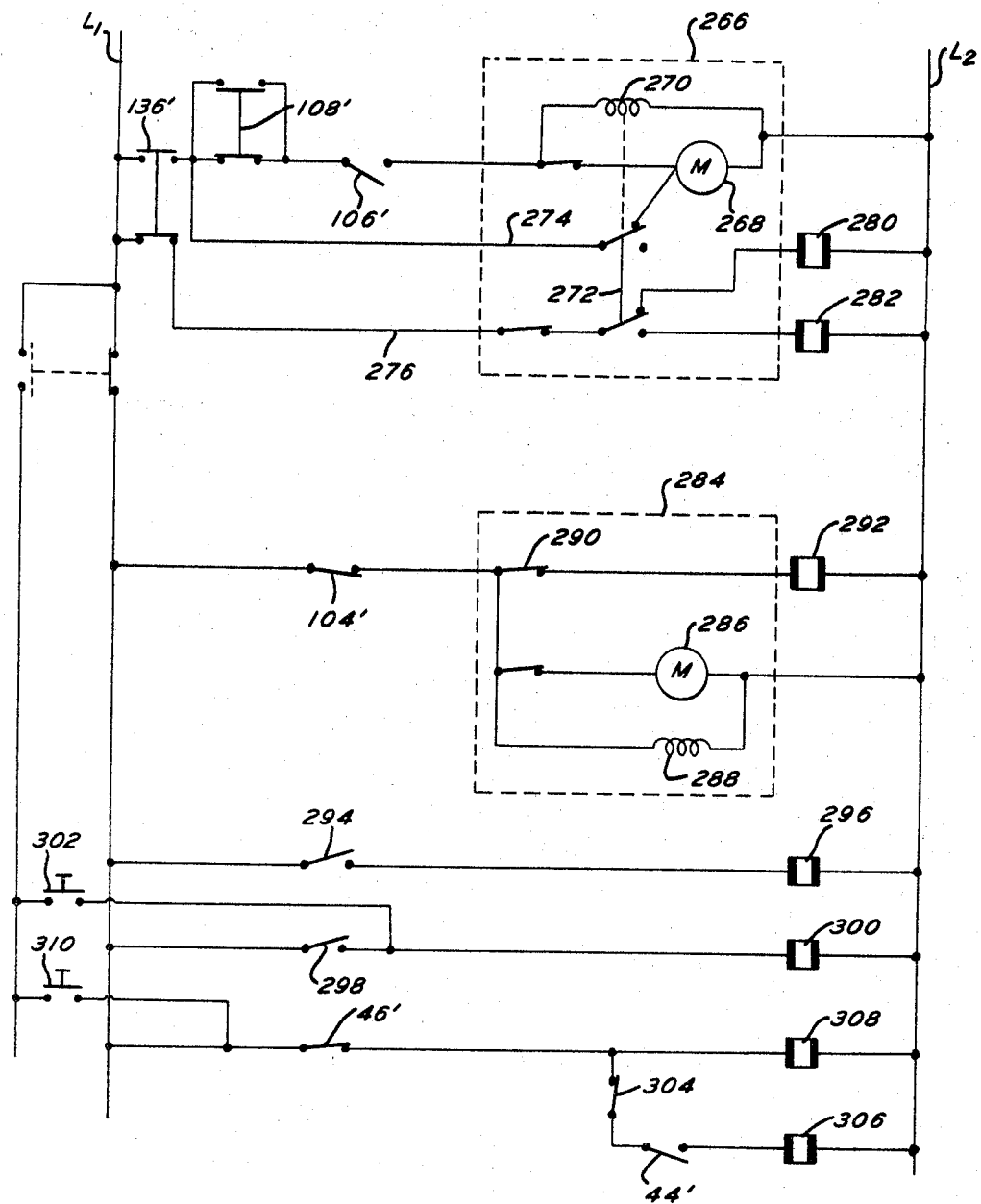
FIGURE 5 is a schematic wiring diagram for the embodiment in FIGURE 4.

Referring to FIGURE 5, there is illustrated therein a schematic wiring diagram for the machine 10' and having lines $L_1$ and $L_2$. It will be noted that the double throw switch 108' is coupled across the lines $L_1$ and $L_2$ in series with the open limit switch 106' and a timer for the mold halves designated generally as 266. The timer 266 includes a timer motor 268 in parallel with a clutch coil 270. A double pole switch 272 is controlled by coil 270. One half of the double pole switch couples conductor 274 to the motor 268. The other half of the double pole switch 272 couples conductor 276 to either relay 280 or 282.

The relays 282 and 280 are on opposite ends of the valve 250 for reciprocating the spool therein in opposite directions. Relays 280 and 282 control valve 250 to, respectively, open and close the mold halves 236 and 238.

The closed limit switch 104' for the mold halves is coupled across the lines $L_1$ and $L_2$ in series with a timer 284 for the valve member 26'. Timer 284 includes a motor 286 in parallel with a clutch coil 288. Motor 286 controls switch 290 which when closed will activate relay 292. Switch 290 is open when the timer 284 times out. Relay 292 controls the solenoid for valve 262.

Switch 294 is coupled across lines $L_1$ and $L_2$ in series with a relay 296. Relay 296 controls normally open switch 298 and normally closed switch 304. When switch 298 is closed, relay 300 is activated. Relay 300 controls the solenoid on valve 60' to enable motive fluid to be introduced into housing 52' by way of conduit 56' to cause the screw 30' to advance to the position illustrated in FIGURE 4. Relay 300 may also be activated by the manual switch 302.

The limit switch 44' is normally open and when closed by trip member 42', the relay 306 is energized. Relay 306 controls the solenoid on valve 100' and when activated operates said valve so that motive fluid may be diverted through relief valve 98' to the return channel 62'. Hence, when valve 100' is activated, the hydraulic motor 76' will be rotating at its slow speed and will be rotating at high speed when it is not activated. Relay 308 controls the solenoid for valve 74' which in turn controls the flow of motive fluid from the pump 70' to the hydraulic motor 76'. Relay 308 may be activated by manual switch 310. Relay 296 will open switch 304 to make the screw 30' step up to high speed as soon as the injection stroke is signalled. Otherwise, screw 30' will rotate at low speed until switch 44' physically opens.

The operation of the machine 10' is similar to that described in connection with the machine 10 with the following additions or changes:

It will be assumed that a full charge of plasticized molding material is provided in an accumulation zone in front of the screw 30' which is in its fully retracted position. Also, it will be assumed that the valve member 26' is in the position illustrated in FIGURE 4. Also, the screw 30' will be rotating since relay 308 is activated and the valve member of valve 74' is in a position wherein motive fluid is being pumped by pump 70' through conduit 72' to the hydraulic motor 76'. Since the mold halves 236 and 238 are in their fully open position, switch 106' is closed and timer 266 has started. As soon as current flows through coil 270, the switch 272 is moved to a position wherein relay 282 is activated. When relay 282 is activated, the spool member in valve 250 is moved to a position wherein motive fluid is pumped from pump 252 to conduit 246 into cylinder 244.

As soon as the mold halves 236 and 238 assume their closed position as illustrated in FIGURE 4, switch 104' is closed thereby starting the timer 284 and energizing relay 292. When relay 292 is energized, it activates the solenoid for valve 262 so that motive fluid may be introduced from pump 264 through conduit 258 into cylinder 256 thereby retracting the valve member 26'. As soon as the valve member 26' is retracted, switch 294 is permitted to close thereby activating relay 296.

When relay 296 is activated, switch 298 is closed and switch 304 is opened. When switch 298 is closed, relay 300 is activated. Activation of relay 300 causes the solenoid for valve 60' to move the spool therein to a position where motive fluid may be pumped from pump 64' through conduit 56' into cylinder 52' whereby the screw 30' will be moved forwardly at high rotation to inject molding material through passageway 24' and sprue cavity 232 into the mold cavity 234.

When timer 284 times out, switch 290 is opened thereby deactivating relay 292. As a result thereof, valve 262 assumes the position illustrated in FIGURE 4 wherein conduit 258 is in communication with the channel 62' and pump 264 is in communication with cylinder 256 by way of conduit 260. The continuously rotating screw 30' continues to introduce plasticized molding material into the accumulation area in front thereof, thereby propelling the screw 30' to the right in FIGURE 4. At the same time, switch 294 is opened thereby deactivating relay 296 and opening switch 298. Switch 304 is now closed and relays 300 and 306 are deactivated.

Timer 284 may also be set for a period of time beyond the time required to fill the mold cavities, in order to maintain a pressure on the plastic to minimize shrink marks on the molded pieces. Under these conditions, line 228 of FIGURE 2 which represents the point at which the screw starts returning, would be determined not by timer 284 timing out but by the time at which the rate of filling the cavities drops below the plasticizing rate of the continuously rotating screw.

When limit switch 44' is contacted by the trip member 42', the switch is closed thereby activating relay 306 which in turn operates valve 100' to reduce the speed of motor 76'.

While the screw 30' is rotating at low speed, timer 266 times out thereby deactivating relay 282 and activating relay 280. When relay 280 is activated, the spool member is valve 250 is moved to a position wherein motive fluid can be introduced from pump 252' through conduit 248 into cylinder 244 to thereby move the mold halves 236 and 238 to their open disposition. When mold half 236 reaches its fully open position, it activates switch 106' to close the same and thereby re-energize timer 266 to repeat the cycle.

In view of the above description with respect to the machines 10 and 10', it is not believed that it is necessary to describe manual operation of both since this operation will be obvious to those skilled in the art.

The present invention may be embodied in other specific forms without departing from the spirit or essential attributes thereof and, accordingly, reference should be made to the appended claims, rather than to the foregoing specification as indicating the scope of the invention.

It is claimed:

1. In a molding machine comprising a transfer cylinder having an outlet passage at one end from which molding material may be delivered for a molding operation, a reciprocable screw transfer member movably disposed in said cylinder for movement with a forward stroke towards said passageway and a return stroke away from said passageway, and means responsive to deviation of said forward stroke from a norm for controlling the speed of the return stroke of said member so that it has a first speed during an initial portion of its return stroke and a speed during the remainder of its return stroke which is less than the first speed.

2. In a machine in accordance with claim 1 wherein said member is a rotatable screw, and means for continuously rotating said screw.

3. In a machine in accordance with claim 1 including a nozzle head coupled to said passageway for receiving molding material therefrom.

4. In a machine in accordance with claim 1 including a pair of mold halves, means coupled to said halves for causing relative movement between an open and closed position of said mold halves, one of said mold halves having a sprue cavity for placing a mold cavity between said mold halves in communication with said passageway, and a valve means for selectively controlling flow of molding material through said passageway.

5. In a molding machine comprising a transfer cylinder having an outlet passage at one end from which molding material may be delivered for a molding operation, a valve means for selectively controlling flow through said passageway, a transfer screw rotatably and reciprocably disposed within said cylinder for movement with a forward stroke towards said passageway and a return stroke away from said passageway whiler otating about its longitudinal axis, and means for controlling the speed of the return stroke of said screw so that it has a first speed during an initial portion of its return stroke and a second speed during the remainder of its return stroke with the second speed being less than the first speed without interrupting the rotation of said screw during its return stroke.

6. In a machine in accordance with claim 5 wherein said last-mentioned means includes a limit switch positioned to be contacted by a trip member on the screw, and means for reducing the speed of rotation of said screw in response to tripping of said switch.

7. In a molding machine comprising a transfer cylinder having a valve outlet passage at one end from which preplasticized molding material may be delivered for a molding operation, a transfer screw movably disposed within said barrel for movement with a forward stroke towards said passageway and a return stroke away from said passageway, means for continuously rotating said screw, means for selectively reciprocating said screw with said forward and return stroke in a manner so that the return stroke occurs through a fixed amount of time, and means associated with said screw for controlling the speed of the return stroke so that the screw has a first speed during an initial portion of its return stroke and a second speed during the remainder of its return stroke, with the second speed being less than the first speed and for a shorter period of time.

8. In a machine in accordance with claim 7 wherein said last-mentioned means includes circuitry having a limit switch adapted to be contacted by a portion of said screw during the return stroke, said switch being coupled to the means for rotating the screw to reduce the speed of rotation of the screw and thereby reduce the speed of movement of the screw during said remainder of the return stroke.

9. In a machine in accordance with claim 8 wherein said means for rotating the screw is a hydraulic motor, and said switch being associated with a fluid control means for diverting fluid adapted to be communicated to said motor thereby decreasing the speed of said motor.

10. In a molding machine comprising a transfer cylinder having a valved outlet passage at one end from which molding material may be delivered for a molding operation, a reciprocable screw transfer member movably disposed within said cylinder for movement between a forward stroke towards said passageway and a return stroke away from said passageway, and means for compensating for a deviation of a forward stroke of said member from a norm during a previous stroke by controlling the speed of the subsequent return strokes so that it has a first speed during an initial portion and a second speed during the remainder of the subsequent return strokes, with the second speed being less than the first speed.

11. A method of controlling a transfer member in a molding machine comprising the steps of introducing molding material into a transfer cylinder of the molding machine, moving a transfer member within the cylinder so that it has a forward stroke and a return stroke, accumulating said molding material in one end of the cylinder to effect a return stroke of said member, compensating a forward stroke of said member in response to a previous return stroke of said member, said compensating step including moving said member during said previous return stroke with an initial first speed and then with a second speed less than said first speed and for a shorter period of time than said initial portion of the return stroke, whereby deviations from a norm with respect to the amount of molding material transferred from said cylinder by said member may be automatically compensated for.

12. In a method of controlling the stroke of a transfer screw in a molding machine comprising the steps of introducing molding material into a transfer cylinder, rotating a screw within said cylinder to preplasticize the material and accumulate said material in one end of said cylinder, moving said rotating screw on a forward stroke to transfer said material from said one end of said cylinder, continuing rotation of said screw to introduce additional molding material into the accumulation area, moving the screw with a return stroke away from said accumulation area as a function of the amount of said additional molding material in said area, compensating for any deviations from a norm on said forward stroke by varying the speed of rotation of said screw during its return stroke from an initial high speed to a terminal low speed while maintaining the period of time for the return stroke a constant.

13. A method of compensating for an undershoot or overshoot in a molding machine comprising the steps of rotating a screw in a cylinder, introducing molding material into said cylinder, moving the material toward one end of the cylinder by rotation of said screw while simultaneously moving the screw away from said one end until a desired amount of molding material has accumulated at said one end, moving the screw axially toward said one end to transfer the accumulated molding material out of said cylinder, and varying the speed of rotation of said screw as it moves away from said one end into a high speed phase and a low speed phase while maintaining the overall time period for the movement of the screw away from said end substantially constant.

14. A method in accordance with claim 13 wherein said step of varying the speed of rotation in said screw includes contacting a limit switch by a portion of said screw after the screw has moved through a portion of its return stroke away from said one end.

15. A molding machine comprising a transfer cylinder having a discharge passage at one end, feed means for delivering material into said one end of the cylinder, said feed means including plunger means and screw means in said cylinder adapted to be retracted by the fluid pressure of such material as it is delivered into the said one end for a predetermined time period by said feed means, means to drive said feed means at least two different speeds, means at a fixed point in the retraction path of said plunger for changing the speed of the feed means from a first speed to a second slower speed, and means for driving the plunger in a forward stroke of a relatively constant forward stroke length.

References Cited

UNITED STATES PATENTS

| | | | |
|---|---|---|---|
| 3,002,229 | 10/1961 | Friedrich | 264—329 |
| 3,165,570 | 1/1965 | Deutsch | 264—329 |
| 3,115,681 | 12/1963 | Hendry | 18—30 |
| 3,001,233 | 9/1961 | Ernst | 18—30 |
| 2,736,922 | 3/1956 | Schieser et al. | |
| 3,008,188 | 11/1961 | Harvey. | |
| 3,068,521 | 12/1962 | Gaspar et al. | |
| 3,133,316 | 5/1964 | Arpajian. | |
| 3,146,287 | 8/1964 | Kleine-Albers. | |

WILBUR L. McBAY, *Primary Examiner.*

U.S. Cl. X.R.

18—5, 30; 264—98, 329